(12) United States Patent
Pedersen et al.

(10) Patent No.: US 7,293,959 B2
(45) Date of Patent: Nov. 13, 2007

(54) WIND TURBINE BLADE WITH LIFT-REGULATING MEANS

(75) Inventors: Bernt Ebbe Pedersen, Kolding (DK); Jørgen Dahl Vestergaard, Kibæk (DK); Peter Grabau, Kolding (DK); Ib Frydendal, Følving (DK)

(73) Assignee: LM Glasfibeer A/S, Luderskov (DK)

( * ) Notice: Subject to any disclaimer, the term of this patent is extended or adjusted under 35 U.S.C. 154(b) by 0 days.

(21) Appl. No.: 10/555,579

(22) PCT Filed: Apr. 29, 2004

(86) PCT No.: PCT/DK2004/000294

§ 371 (c)(1),
(2), (4) Date: Nov. 4, 2005

(87) PCT Pub. No.: WO2004/099608

PCT Pub. Date: Nov. 18, 2004

(65) Prior Publication Data

US 2007/0003403 A1    Jan. 4, 2007

(30) Foreign Application Priority Data

May 5, 2003    (DK) ............................. 2003 00670

(51) Int. Cl.
*F03B 3/12*    (2006.01)
(52) U.S. Cl. .......................................... 416/23; 416/41
(58) Field of Classification Search .................. 416/23, 416/24, 41, 62, 33, 37, 132 B
See application file for complete search history.

(56) References Cited

U.S. PATENT DOCUMENTS 2,622,686 A * 12/1952 Chevreau et al. ............. 416/23

| 4,692,095 | A | 9/1987 | Lawson-Tancred | 416/23 |
| 6,361,275 | B1 | 3/2002 | Wobben | 416/33 |
| 2004/0067134 | A1* | 4/2004 | Beauchamp et al. | 416/37 |

FOREIGN PATENT DOCUMENTS

WO    WO97/01709    1/1997

\* cited by examiner

*Primary Examiner*—Edward K. Look
*Assistant Examiner*—Dwayne J White
(74) *Attorney, Agent, or Firm*—Cooper & Dunham LLP

(57) ABSTRACT

Wind turbine blade (10) including adjustable lift-regulating means (12, 13, 15, 17, 19, 21) arranged on or at the surface of the wind turbine blade (10), said lift-regulating means being provided with activating means by means of which they can be adjusted and thus alter the aerodynamic properties of the blade (10). The lift-regulating means (12, 13, 15, 17, 19, 21) and the activating means are adapted and arranged such that by activation of the activating means, the lift can be reduced in a zone extending in the longitudinal direction of the blade (10) from a first position adjacent the blade tip (14) to a second position between the position and the blade root (16) and this second position is variable in the longitudinal direction of the blade (10) by adjusting activate means. The lift-regulating means are formed of at least one flexible flap (12, 13, 15, 17, 19, 21). The invention further relates to a wind turbine rotor including such wind turbine blades, to a wind turbine and to a method of controlling the wind turbine.

19 Claims, 4 Drawing Sheets

WIND TURBINE BLADE WITH LIFT-REGULATING MEANS

TECHNICAL FIELD

The invention relates to a wind turbine blade provided with adjustable lift-regulating means arranged on or at the surface of the wind turbine blade and extending in the longitudinal direction of the blade, and with activating means by means of which the lift-regulating means may be adjusted to change the aerodynamic properties of the blade, the lift-regulating means and the activating means being adapted and arranged such that by activation of the activating means the lift can be reduced in a zone extending from a first position adjacent the blade tip to a second position between the first position and the blade root, and this second position being variable in the longitudinal direction of the blade by activating the activating means. The invention further relates to a wind turbine rotor including such wind turbine blades, to a wind turbine and to a method of controlling such a wind turbine.

Modern wind mills, also called wind turbines or wind engines, are used to produce electricity. They are often very large structures with blades of up to and in excess of 60 metres and made from fibre-reinforced polymer shells. These wind turbines are provided with control devices which may prevent a overloading of the wind turbine and the blades at wind gusts and high wind speeds. Such control devices can also be used to brake the turbine and bringing it to a complete halt, if the wind speed becomes too high. In addition to these devices the turbine may comprise a braking device arranged in communication with the main shaft of the wind turbine.

The control devices may be formed of pitch-controlled blades mounted such on the hub that they are able to turn about the longitudinal axis. The blades may thus be continuously adjusted to provide the lift rendering the desired power. In so-called stall-controlled wind turbines the blades are fixedly mounted on the hub and thus unable to turn about their longitudinal axis. The stall properties of the blades are used to reduce the aerodynamic lift and thus the power output.

BACKGROUND ART

U.S. Pat. No. 6,361,275 (Wobben) discloses a wind turbine, wherein the pitch angles of each wind turbine blade can be adjusted independently such that corrections for varying wind speeds in the swept area of the wind turbine blades can be made. The wind speed often increases with the distance to the surface of the ground and it may thus be advantageous to adjust the lift power of the blades such that the load on the blade is substantially uniform during its entire rotation. However, this solution may also be used to compensate for other types of variations in the wind speed in the rotor plane.

The wind turbine according to U.S. Pat. No. 6,361,275 is, however, encumbered by the drawback that the adjustment cannot be made particularly fast, the conventional pitch hydraulics of the blade being used for this purpose. The hydraulics is not adapted for fast and almost instantaneous movements since a wind turbine blade, whose dead load may exceed 10 tons, has a comparatively large inertia.

As mentioned above, particularly at large wind turbines, eg offshore wind turbines, the wind speed may vary greatly locally in the area swept by the rotor. The rotor may have a diameter of more than 120 metres for which reason the wind speed may vary greatly due to local wind gusts and turbulence both in height and width.

In WO 97/01709 (Bonus Energy A/S) reference is made to wind turbine blades with active, adjustable flaps for changing the aerodynamic properties of the blade.

U.S. Pat. No. 4,692,095 relates to a wind turbine blade according to the background of the present disclosure.

According to a first aspect, the object of the invention is to provide a wind turbine blade of the modern, aerodynamic type with improved regulating properties to enhance the adjustment of the wind turbine to various wind conditions.

DESCRIPTION OF THE INVENTION

In accordance with the invention, this object is attained in that the lift-regulating means of the wind turbine blade stated in the introduction are formed of at least one flexible flap extending in the longitudinal direction of the blade and being adjustable by means of one or more activating means to allow the lift-altering setting thereof to be changed gradually in the longitudinal direction of the flap. As a result a particularly smooth and gradual change in the lift of the blade is obtained in a simple manner.

The wind turbine may operate at high wind speeds as the lift from the blade tip and inwards can be reduced as the wind speed increases. As a result, the turbine is operational at wind speeds above the so-called "cut-out wind speed" at which the turbine otherwise would have been stopped due to an excessive load. These options make it possible to provide a wind turbine with longer blades than usual, said blades being relieved of the load as the wind speed increases, whereby the operating range of the wind turbine as regards wind speed is increased. A considerable advantage is that the bending moment to which the blade root is subjected can be reduced. The forces acting on the outermost portion of the blade adjacent the blade tip have a comparatively heavy impact on the bending moment at the blade root for which reason it is advantageous to reduce the lift in the outermost portion of the blade.

According to an embodiment, the lift-regulating means of the blade may be formed of at least two flaps displaced in relation to each other in the longitudinal direction of the blade. This is a particularly simple embodiment.

According to particularly simple embodiment the flap(s) is/are fixedly supported along a line in the longitudinal direction of the blade and flexibly shaped. This is a particularly simple and secure way of providing the flap, the use of mechanical hinge members thereby further being avoided.

The activating means may for instance be driven by hydraulics, electromagnetism, pneumatics or piezoelectric fibres. Especially a piezoelectric activating means is capable of activating a flap at a significantly higher rate than the rate at which for instance a hydraulic activating means operates. The rate of the above type of piezoelectric activating means is practically instantaneous enabling a fast adjustment of the aerodynamic properties of the blade. Furthermore, it is easy and mechanically simple to install piezoelectric activating means, the only installation required is the supply of power to each or to a series of activating means. Such a solution is thus without mechanical elements and is in practice maintenance-free.

According to an embodiment the flap may be shaped as a stall-generating flap adjacent the leading edge of the blade, when activated said flap altering the stall properties of the blade. Such means promote the stall tendency of the blade, ie. the formation of separated air flows on the aerodynamic suction side of the blade, whereby the lift is reduced.

According to a preferred embodiment the blade includes load sensors arranged in or on the blade, said sensors measuring the loads on the blade in form of for instance wind pressure or strain. These sensors may suitably be used to adjust the lift-regulating means.

According to an advantageous embodiment, the wind turbine blade includes a control system with a control unit communicating with the activating means and the load sensors such that the control unit can activate the activating means and thus adjust the flap(s) in accordance with the measurements made by the load sensors. Such a wind turbine blade may thus be "automatically controlled" in that it per se adapts its lift according to the load and thus requires no external control.

According to a particularly advantageous embodiment of the wind turbine blade, the control system thereof may be adapted such that it may be linked with other corresponding wind turbine blades on the same wind turbine to allow activation of the activating means on the basis of the load measurements from one or more of the other blades. As a result, for instance when the turbine is hit by a wind gust, the blade may more easily attain optimum lift properties based on the load data received from another blade before it is subjected to the loads to which the other blade just has been subjected. In a typical situation the blades are subjected to higher wind speeds when they are in the upper portion of the rotor plane during their rotation than when they are in the lower portion of the rotor plane. A blade may thus receive date from an upwardly facing blade and make adaptation before it per se reaches its upward position during rotation. At yaw errors, ie when the nacelle is not adjusted in the optimum manner in relation to the wind direction, the blades are also subjected to loads, which vary according to their position in the rotational plane. Such varying loads may also be compensated by means of the blade according to the invention.

A second aspect of the invention relates to a wind turbine rotor having a number of such wind turbine blades, preferably three, said rotor comprising a central control system with a control unit, eg. built-in the rotor hub, and connected with the load sensors and flap(s) of each blade to allow the control unit to adjust the flap(s) of one or more of the other blades based on the load measurements from each blade and/or the setting of the flap(s) of each blade.

The invention also relates to a wind turbine comprising the above wind turbine blades or the above rotor.

Finally the invention relates to a method of controlling such a wind turbine, wherein the second position between the first position and the blade root is varied in the longitudinal direction of the blade by adjusting the activating means on the basis of the measured loads or measured wind speeds.

The method is particularly suitable for controlling a wind turbine having pitch-controlled blades and wherein the rotational speed of the blades is kept substantially constant.

BRIEF DESCRIPTION OF THE DRAWINGS

The invention is explained in greater detail below with reference to the drawing illustrating embodiments of the invention and in which.

BEST MODES FOR CARRYING OUT THE INVENTION

Figure 1:
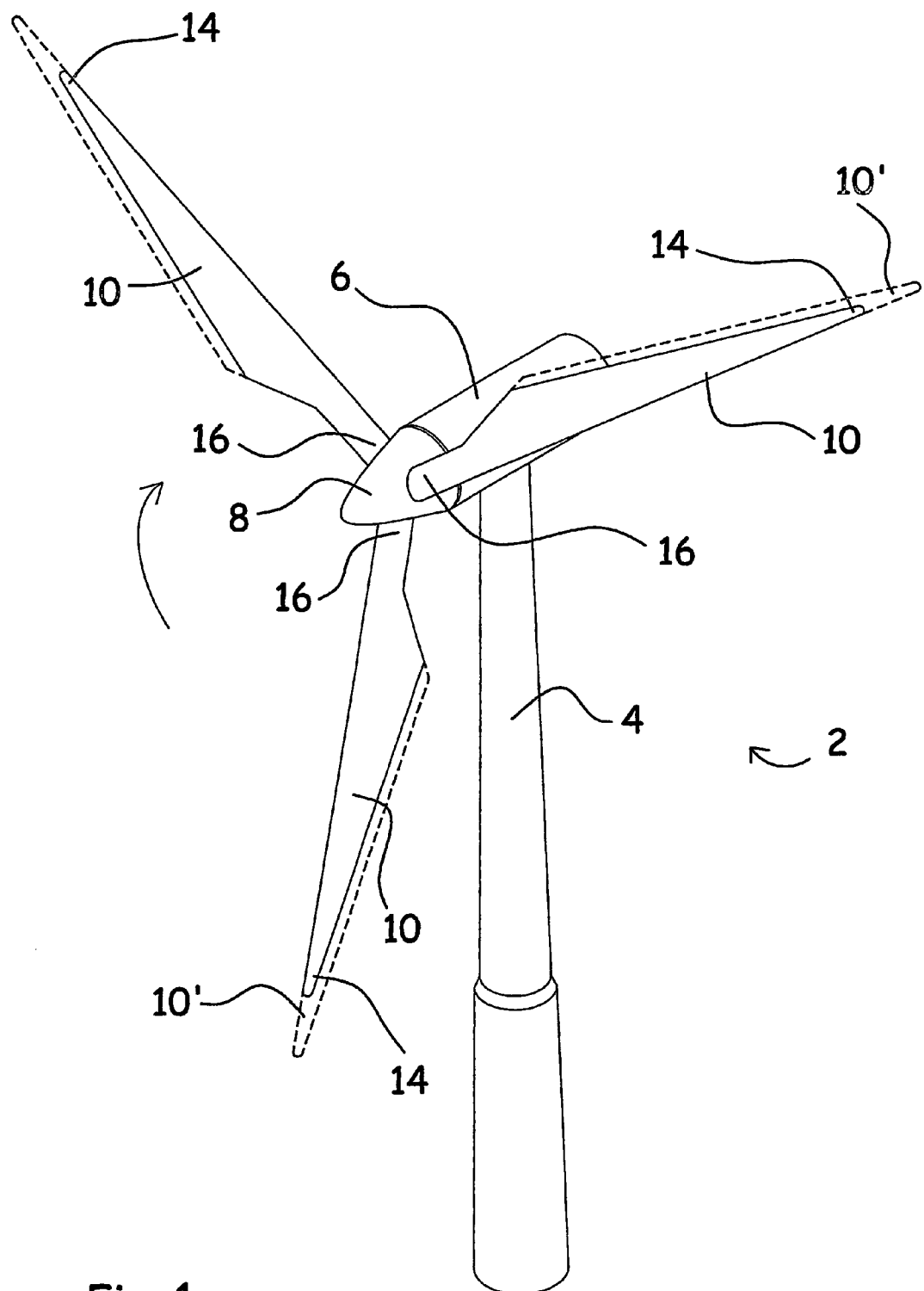
FIG. 1 shows a wind turbine.

FIG. 1 illustrates a conventional modern wind turbine with a tower 4, a nacelle 6 and a rotor including a hub 8 and three blades 10 extending therefrom. The blades 10 may be provided with lift-regulating means, which by activation of the activating means at high wind speeds can gradually reduce the lift of the blade in a zone extending from the blade tip 14 to a position between the blade tip and the blade root 16. As a result, at high wind speeds the blade 10 is relieved in a zone extending from the blade tip 14 and inwardly towards the root 16 such that a wind turbine 2 with a given blade 10 can remain in operation at higher wind speed than usual. The invention also renders it possible to provide a wind turbine 2 with longer blades 10' than usually, said blades merely being relieved by the lift-regulating means at increasing wind speeds and thus at increasing loads such that an overloading of the turbine and the blade is prevented.

Figure 2:
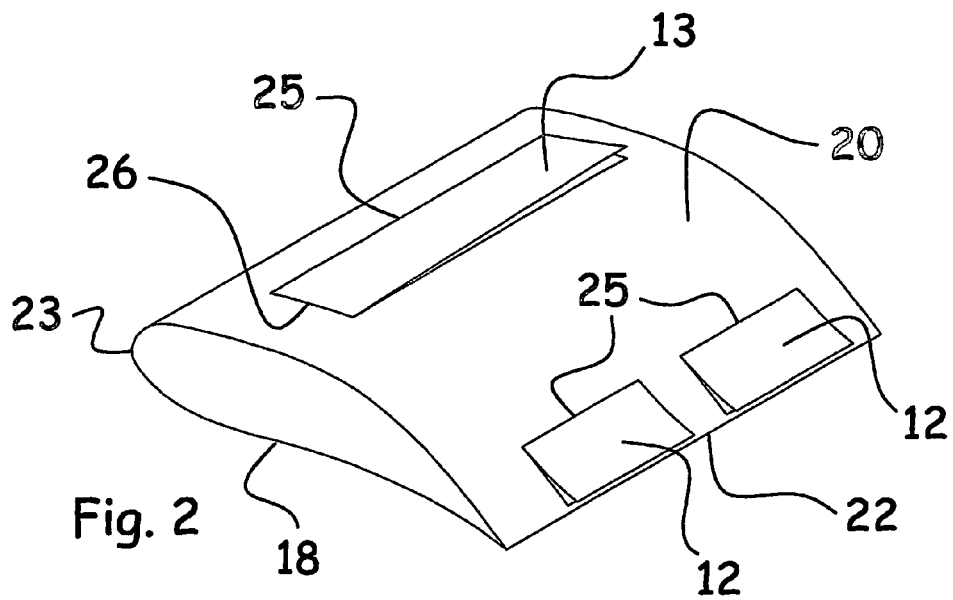
FIG. 2 is an isometric view of a part of an area of a blade profile provided with regulating means according to an embodiment.

FIG. 2 is a sectional view of a blade profile, various embodiments of the lift-regulating means in form of two adjustable flaps 12 adjacent the trailing edge 22 of the blade being shown on the aerodynamic suction side 20 and a single comparatively long stall-generating flap 13 on the suction side of the blade adjacent the leading edge 23 of the blade. The shown flaps are integrally formed with the blade material and connected along fixedly-supported edges 25. Not-shown activating means are provided on the lower face of the flaps 12, 13. When these activating means are activated the flap is pushed upwards to change the surface profile of the suction side 20. The activating means may for instance be in form of hydraulic, pneumatic, electromagnetic or piezoelectric means (actuators). It is advantageous that the activating means are able to react relatively fast, especially if the flaps have to be adjusted one or more time for each rotation of the wind turbine blade. Piezoelectric activating means based on piezoelectric fibres are especially interesting. Such means are virtually maintenance-free due to the lack of parts being worn caused by friction.

The two flaps 12 along the trailing edge 22 may each be provided with a single activating means. The flap 13 positioned adjacent the leading edge 23 of the blade is fixedly supported to the blade along two edges 25, 26 and provided with an activating means in one end. Due to the flexibility of the flap material the flap 13 renders a gradually increasing lift-reducing effect in the direction of the end of the flap 13 being furthest to the right in FIG. 2. The flap 13 may, however, also be fixedly supported only along the long edge 25 and be provided with activating means in both ends. In contrast to the flaps 12 adjacent the trailing edge 22 of the blade which primarily alter the lift of the blade without generating stall, the flap 13 may have a stall-generating effect by ensuring when activated that the air flow is separated over the suction side 20 of the blade and thus reducing the lift of the blade.

Figure 3:
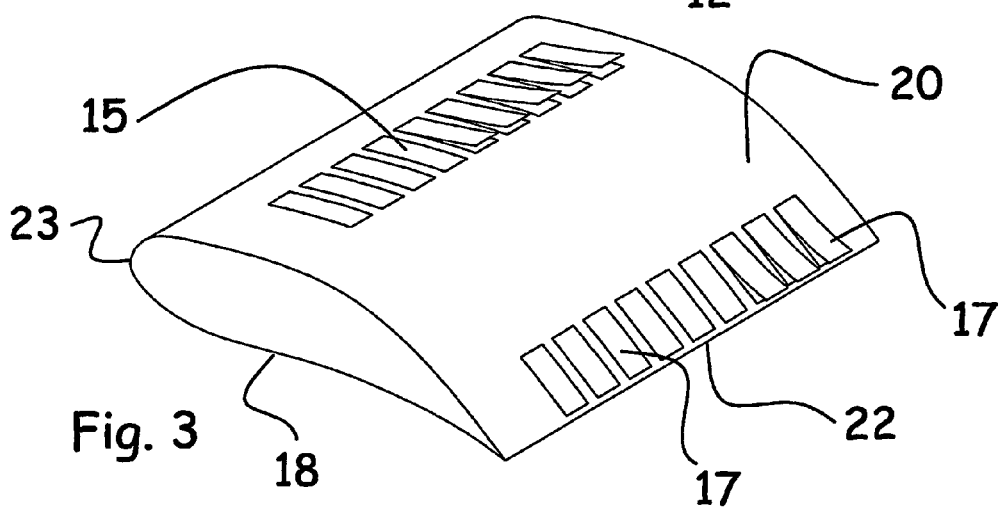
FIG. 3 is an isometric view of a part of an area of a blade profile according to a second embodiment.

FIG. 3 illustrates a second embodiment, wherein a plurality of small flaps 17, 15 is provided along the trailing edge 22 of the blade and adjacent the leading edge 23 of blade. As a result a more accurate adjustment of the lift properties of the blade is obtained. The non-shown activating means may be of a simple type adjustable in two or three step or step-less. If a plurality of small flaps 15, 17 as used, as shown in FIG. 3, simple on/off activating means may optionally be used. For obtaining a gradually reduced lift in the direction from the blade tip, a first area with a number of flaps adjacent the blade root may have inactivated activating means, an area between the first area and the blade tip may have a number of flaps of which every other flap is activated, and a third area adjacent the blade tip, where all flaps are activated. As a result three zones are obtained, in which a first zone has unchanged lift, a second zone has partially reduced lift and a third zone adjacent the blade tip has heavily reduced lift.

Figure 4:
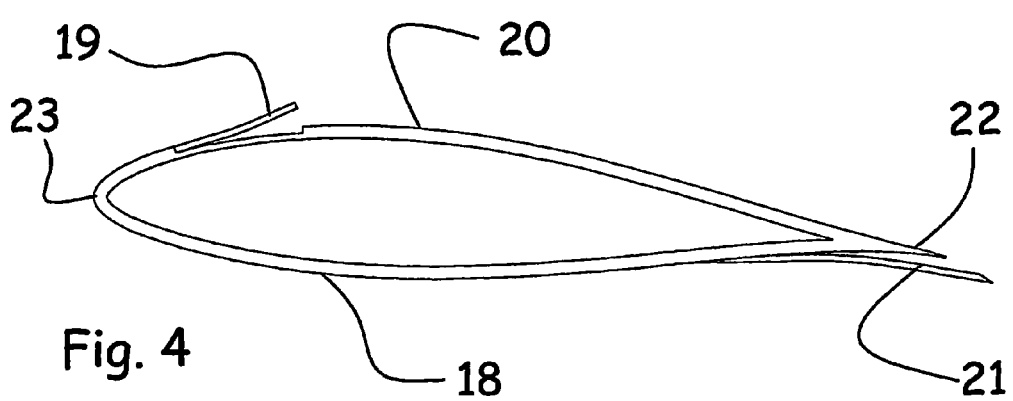
FIG. 4 is a cross-sectional view through a wind turbine blade with regulating means according to the invention.

As evident in FIG. 4, which is cross-sectional view of a blade profile, the active flaps 19, 21 may be arranged on the pressure side 18 and/or on the suction side 20 of the blade profile. By placing active flaps 21 on the pressure side 18 and specifically at the trailing edge 22 of the blade on the pressure side 18 it is possible to adjust the blade 10 to an optimum lift at varying wind speeds. It is thus possible at increasing wind speeds to make adjustments by means of the flaps 21 on the pressure side 18 of the blade for reducing the lift. The lift may further be reduced with the flaps 19 on the suction side 20 of the blade adjacent the leading edge 23 of the blade by generating stall on the suction side 20 of the blade.

Figure 5:
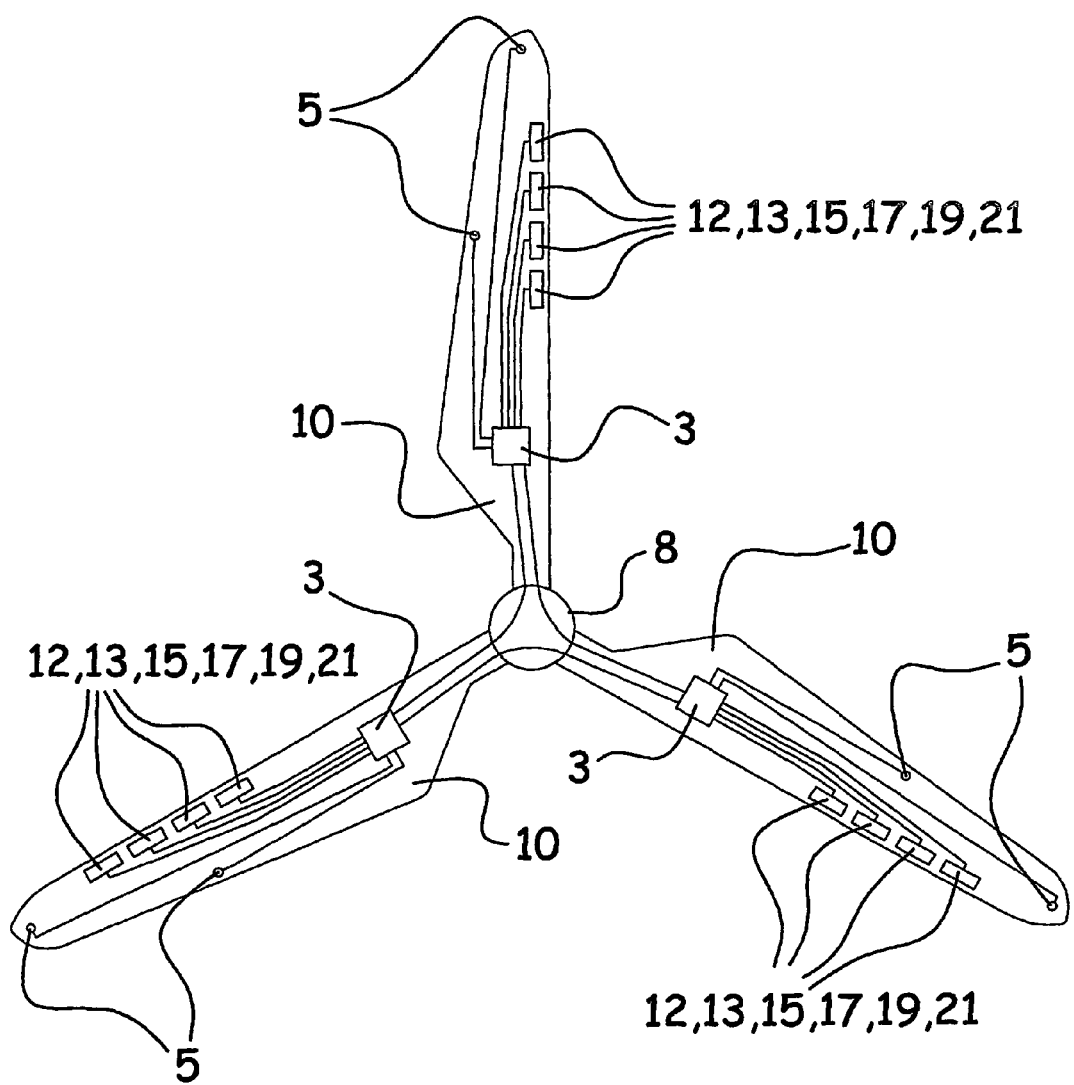
FIG. 5 is a diagrammatic view of a wind turbine rotor with a control system.

FIG. 5 is a diagrammatic view of a rotor with a hub 8 and three wind turbine blades 10 extending from the hub 8. Each blade 10 is provided with a control system including an electronic control unit 3 connected to the activating means of the lift-regulating means 12, 13, 15, 17, 19, 21. The control unit 3 is further connected to load sensors 5 measuring the load on the wind turbine blade. The load sensors 5 may for instance be strain gauges mounted on the inner face of the blade shell or a bracing interconnecting the inner faces of the blade shell and thus measures the strain caused by the wind load. Optionally pressure gauges measuring the wind pressure on the blade may be used as load sensors.

As evident in FIG. 5, the control units 3 of each blade 10 may be interconnected such that data about the load on a first blade 10 or the flap setting thereof is transmitted to the other blades 10. As a result the flaps 12 thereof can be adjusted to the wind action to which they are subjected when they adopt the position of the first blade 10 during rotation.

The control systems of the blades may be interconnected in such a manner that a single control unit 3 controls all of the lift-regulating means of the blades 10. This control unit 3 may be placed in one of the blades, in the hub, in the nacelle, in the turbine tower 4 or outside of the turbine.

Figure 6:
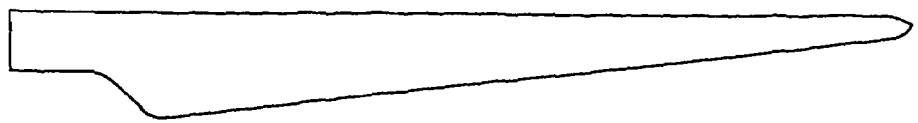
FIG. 6 is a side view of a wind turbine blade.
Figure 7:
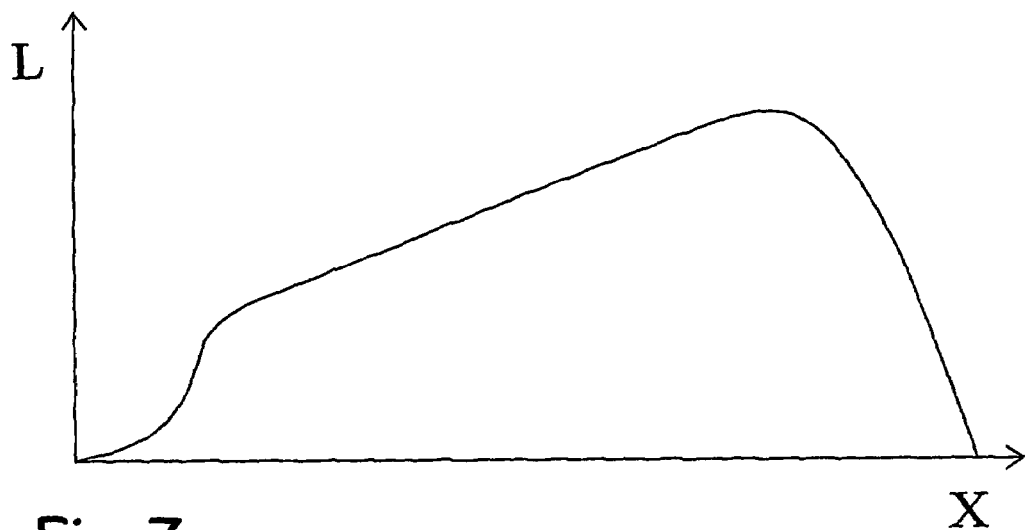
FIG. 7 is a graph showing the lift of a wind turbine blade profile as a function of the distance to the blade root.

FIG. 6 is a side view of a wind turbine blade. FIG. 7 shows a graph diagrammatically illustrating the lift L of the blade as a function of the distance X from the blade root. The lift of the blade thus increases gradually along the blade and decreases to 0 at the blade tip.

Figure 8:
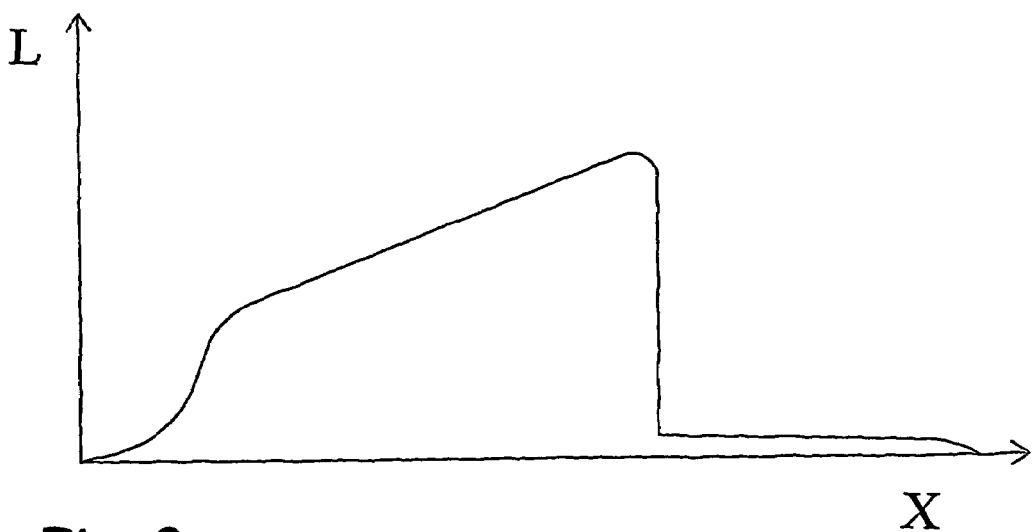
FIG. 8 is a graph as the one shown in FIG. 7, the lift being here reduced in a zone along an outer portion of the blade.

FIG. 8 illustrates a situation in which the lift-regulating means 12, 13, 15, 17, 19, 21 are activated along an outer zone of the blade. In this zone the lift has been reduced to nearly 0. The length of this zone is adjustable depending on the wind load, the abrupt transition can be moved inwards towards the blade root—to the left in FIG. 8—or outwards towards the blade tip—to the right in FIG. 8. The lift-regulating means and the activating means may be formed and/or adjustable such that the lift is gradually reduced in the direction towards the blade tip. By using a number of stepwise adjustable flaps, the graph in the activated zone may be shaped as a flight of steps.

In addition to wind speed registrations and strain measurements, power output data from the generator in the nacelle may also be used to adjust the flaps.

Wind predictions may also be performed using the solution described in WO 98/42980, in which the wind speed at a certain distance in front of the wind turbine is measured by means of laser equipment. This method is advantageously combined with the flaps described above, the blades thus being "ready" when the predetermined wind situation occurs in the rotor plane.

The method of adjusting the aerodynamic properties of the blades described above makes it easier—particularly with pitch-controlled wind turbines—to maintain a substantially constant rotational speed even if the wind turbine is affected by wind gusts, eg due to turbulence, and other variations in the wind speed. Furthermore, the load on the blades is significantly more uniform in that variations in the speed profile of the wind can be part of the regulating parameters such that corrections for wind variations in the rotor plane can be made. It is also possible to make corrections for the wind shade exerted by the wind turbine tower on the rotor.

The invention may be used in connection with stall-controlled wind turbines with a constant speed of revolution and in connection with wind turbines with a varying speed of revolution. The invention is, however, particularly advantageous when used to operate pitch-controlled wind turbines with a substantially constant rate. The cost of the expensive electric components required for converting the alternating current of varying frequency generated by wind turbines with variable rotational speed to an alternating current of constant frequency is thus saved.

The invention claimed is:

1. Wind turbine blade including adjustable lift-regulating means arranged on or at a surface of the wind turbine blade and extending in a longitudinal direction of the blade, and activating means by which the lift-regulating means can be adjusted and thus alter the aerodynamic properties of the blade, the lift-regulating means and the activating means being adapted and arranged such that by activation of the activating means, the lift can be reduced in a zone extending in the longitudinal direction of the blade from a first position adjacent a tip of the blade to a second position between the first position and a root of the blade and this second position being variable in the longitudinal direction of the blade by adjusting the activating means characterised in that the lift-regulating means are formed of at least one flexible flap arranged on or at the surface of the wind turbine blade having a fixed blade profile, the at least one flexible flap extending in the longitudinal direction of the blade and being adjustable by means of one or more activating means to allow the lift-altering setting of the flap to be changed gradually in the longitudinal direction of the flap in order to reduce the lift of the blade gradually in the zone between the first position and the variable second position.

2. Wind turbine blade according to claim 1, characterised in that the lift-regulating means are formed of at least two flaps being displaced in relation to each other in the longitudinal direction of the blade.

3. Wind turbine blade according to claim 1, characterised in that the flap(s) is/are fixedly supported along a line in the longitudinal direction of the blade.

4. Wind turbine blade according to claim 1, characterised in that the activating means are driven by hydraulics, electromagnetism, pneumatics or piezoelectric fibres.

5. Wind turbine blade according to claim 1, characterised in that the flap is a stall-generating flap adjacent the leading edge of the blade.

6. Wind turbine blade according to claim 1, characterised in that it comprises load sensors arranged in or on the blade and measuring wind loads in form of wind pressure or strain.

7. Wind turbine blade according to claim 6, characterised in that it comprises a control system with a control unit connected with the activating means and the load sensors such that the control unit may activate the activating means and thus adjust the flap(s) in accordance with the measurements made by the load sensors.

8. Wind turbine blade according to claim 7, characterised in that the control system is adapted such that it can be linked with other corresponding blades on the same wind turbine to allow activation of the activating means on the basis of the load measurements from one or more of the other blades.

9. Wind turbine rotor with a plurality of wind turbine blades according to claim 8, said wind turbine rotor including a central control system with a control unit, and connected with the load sensors and flap(s) of each blade to allow the control unit to adjust the flap(s) of one or more of the blades based on the load measurements from each blade and/or the setting of the flap(s) of each blade.

10. Wind turbine rotor according to claim 9 comprising three wind turbine blades.

11. Wind turbine rotor according to claim 9 comprising a rotor hub, wherein the control unit of the central control system is mounted in the hub.

12. Wind turbine comprising a rotor according to claim 9.

13. Wind turbine comprising wind turbine blades according to claim 1.

14. Method of controlling a wind turbine according to claim 13, wherein the second position between the first position and the blade root is varied in the longitudinal direction of the blade by adjusting the activating means on the basis of the measured loads or measured wind speeds.

15. Method according to claim 14 for controlling a wind turbine, in which the blades are pitch-controlled and in which the rotational speed of the blades is kept substantially constant.

16. A fixed profile wind turbine blade having a variable surface profile, comprising:

at least one flexible flap arranged on or at a surface of the wind turbine blade and extending in a longitudinal direction of the blade; and at least one actuator for adjusting the at least one flexible flap to alter a surface profile and aerodynamic properties of the wind turbine blade, wherein the at least one flexible flap and the at least one actuator are arranged so that when the at least one actuator adjusts the at least one flexible flap, lift can be reduced in a zone extending in the longitudinal direction of the wind turbine blade from a first position adjacent a tip of the wind turbine blade to a second position between the first position and a root of the wind turbine blade, wherein the second position is variable in the longitudinal direction of the wind turbine blade by adjusting the at least one flexible flap with the at least one actuator, the at least one actuator allowing a lift-altering setting of the at least one flap to be changed gradually in the longitudinal direction of the wind turbine blade in order to reduce the lift of the wind turbine blade gradually in the zone between the first position and the variable second position.

17. A fixed profile wind turbine blade according to claim 16, wherein the at least one flap is fixedly supported along a line in the longitudinal direction of the wind turbine blade.

18. A fixed profile wind turbine blade according to claim 16, wherein the actuator comprises at least one of hydraulics, electromagnetism, pneumatics or piezoelectric fibres.

19. A fixed profile wind turbine blade according to claim 16, wherein the at least one flap is a stall-generating flap located adjacent a leading edge of the blade.

* * * * *